United States Patent
Tian et al.

(10) Patent No.: US 9,401,165 B1
(45) Date of Patent: Jul. 26, 2016

(54) METHOD AND SYSTEM TO MONITOR MAGNETIC HEAD LOADING AND UNLOADING STABILITY FOR A DATA STORAGE SYSTEM

(71) Applicant: Western Digital Technologies, Inc., Irvine, CA (US)

(72) Inventors: Jifang Tian, Fremont, CA (US); Alain Chahwan, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 42 days.

(21) Appl. No.: 14/303,955

(22) Filed: Jun. 13, 2014

Related U.S. Application Data (60) Provisional application No. 61/988,496, filed on May 5, 2014.

(51) Int. Cl.
G11B 27/36 (2006.01)
G11B 21/02 (2006.01)
G11B 5/55 (2006.01)

(52) U.S. Cl.
CPC .................................. G11B 5/5582 (2013.01)

(58) Field of Classification Search
None
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,236,527 B1 * | 5/2001 | Uchiike | G11B 5/54 360/75 |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |

(Continued)

*Primary Examiner* — Regina N Holder (57) ABSTRACT

A method and system to monitor stability of magnetic head loading and unloading beside media for a data storage system is described. A shock sensor is utilized to detect shock during preloading of a magnetic head beside recording media, during loading of a magnetic head beside recording media, during pre-unloading of a magnetic head from the recording media, and/or during unloading of a magnetic head from the recording media. In an aspect, a desired pitch static attitude (PSA) and roll static attitude (RSA) of a slider is determined. In an aspect, the stability of a magnetic head is assessed and screened while on the fly and during head gimbal assembly (HGA) design and testing to improve overall data storage device reliability.

18 Claims, 8 Drawing Sheets

(56) References Cited

U.S. PATENT DOCUMENTS

| | | |
|---|---|---|
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |

(56) References Cited

U.S. PATENT DOCUMENTS

| | | |
|---|---|---|
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,701,660 B1 * | 4/2010 | Sutardja ............... G11B 5/5582 360/77.02 |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,796,356 B1 | 9/2010 | Fowler et al. |
| 7,800,858 B1 | 9/2010 | Bajikar et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,179,626 B1 * | 5/2012 | Ryan ................... G11B 19/042 360/31 |
| 8,190,575 B1 | 5/2012 | Ong et al. |
| 8,194,338 B1 | 6/2012 | Zhang |
| 8,194,340 B1 | 6/2012 | Boyle et al. |

(56) References Cited

U.S. PATENT DOCUMENTS

| | | |
|---|---|---|
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,335,053 B2 | 12/2012 | Chen et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 9,013,825 B1 * | 4/2015 | Chahwan ............ G11B 5/59694 360/75 |
| 2009/0113702 A1 | 5/2009 | Hogg |
| 2010/0306551 A1 | 12/2010 | Meyer et al. |
| 2011/0157736 A1 | 6/2011 | Contreras et al. |
| 2011/0226729 A1 | 9/2011 | Hogg |
| 2012/0120521 A1 | 5/2012 | Kurita et al. |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0083430 A1 | 4/2013 | Chiu et al. |
| 2013/0170073 A1 * | 7/2013 | Zhao et al. ................ 360/97.19 |

* cited by examiner

METHOD AND SYSTEM TO MONITOR MAGNETIC HEAD LOADING AND UNLOADING STABILITY FOR A DATA STORAGE SYSTEM

CROSS-REFERENCE TO RELATED APPLICATIONS

This application claims the benefit of priority to U.S. Provisional Patent Application Ser. No. 61/988,496, entitled "METHOD AND APPARATUS TO MONITOR LOADING STABILITY OF A HEAD," filed on May 5, 2014, which is hereby incorporated by reference in its entirety.

BACKGROUND

Magnetic storage systems are utilized in a wide variety of devices in both stationary and mobile computing environments. Magnetic storage systems include hard disk drives (HDD), and solid state hybrid drives (SSHD) that combine features of a solid-state drive (SSD) and a hard disk drive (HDD). Examples of devices that incorporate magnetic storage systems include desktop computers, portable notebook computers, portable hard disk drives, servers, network attached storage, digital versatile disc (DVD) players, high definition television receivers, vehicle control systems, cellular or mobile telephones, television set top boxes, digital cameras, digital video cameras, video game consoles, and portable media players.

BRIEF DESCRIPTION OF THE DRAWINGS

The foregoing aspects and many of the attendant advantages described herein will become more readily appreciated by reference to the following detailed description, when taken in conjunction with the accompanying drawings, wherein.

DETAILED DESCRIPTION

In the following description, numerous specific details are disclosed to provide a thorough understanding of embodiments of the method, system and apparatus. One skilled in the relevant art will recognize, however, that embodiments of the method, system and apparatus described herein may be practiced without one or more of the specific details, or with other electronic devices, methods, components, and materials, and that various changes and modifications can be made while remaining within the scope of the appended claims. In other instances, well-known electronic devices, components, structures, materials, operations, methods, process steps and the like may not be shown or described in detail to avoid obscuring aspects of the embodiments. Embodiments of the apparatus, method, and system are described herein with reference to figures.

Reference throughout this specification to "one embodiment," "an embodiment," or similar language means that a particular feature, structure, electronic device, or characteristic described in connection with the embodiment is included in at least one embodiment. Thus, appearances of the phrases "in one embodiment," "in an embodiment," and similar language throughout this specification may refer to separate embodiments or may all refer to the same embodiment. Furthermore, the described features, structures, electronic devices, or characteristics may be combined in any suitable manner in one or more embodiments.

A hard disk drive (HDD) typically includes magnetic storage media of one or more flat disks. The disks are generally formed of two main substances, namely, a substrate material that gives it structure and rigidity, and a magnetic media coating that holds the magnetic impulses or moments that represent data. A hard disk drive also typically includes a read head and a write head, generally a magnetic transducer which can sense and/or change the magnetic fields stored on the disks. Perpendicular magnetic recording (PMR) involves recorded bits that are stored in a generally planar recording layer in a generally perpendicular or out-of-plane orientation. A PMR read head and a PMR write head are usually formed as an integrated read/write head on an air-bearing slider.

Hard disk drive performance demands and design needs have intensified. The current demand for larger capacity in a smaller dimension is linked to the demand for ever increasing storage track density. As the density of data on the magnetic storage medium increases, the strength of the magnetic fields generally decrease, in order to minimize interference. Areal density (the number of bits that can be stored in an area of the disk) has been increased over time by increasing both the number of tracks across the disk, and the number of sectors per track. Higher areal density in magnetic storage medium requires accurate positioning of the read/write transducer. The read and write head is connected to a distal end of an actuator arm which is rotated about a pivot by a voice coil motor (VCM) to position the head radially over the disk. The seek time is the time it takes the head assembly to travel to the disk track where the data will be read or written. The time to access data can be improved by reducing seek time, which affects HDD performance.

Reduced seek time and very close spacing between the heads and the disk surface make HDDs vulnerable to damage caused by head-media contact, which may cause data loss. Head-media contact can be caused by a variety of reasons (other than physical shock to the HDD or a vibration environment in which the HDD is situated) including manufacture variations of the actuator arm, head gimbal assembly (HGA), head stack assembly (HSA), head, and media. Some HDDs may experience one or multiple heads with head-media contact during the head loading or unloading process to and from a disk surface. While this can result in immediate head and media failure or data loss, repeated head-media contact can result in eventual head and media degradation, including DLC wear at the air bearing surface, depletion of media surface lubrication, and scratches to media surface, which can also result in head and media failure or data loss.

An apparatus, system and method are described herein for monitoring the loading and unloading stability of a head with respect to media, using a shock sensor. In an embodiment, this also allows for determining a desired pitch static attitude (PSA) and roll static attitude (RSA) of a slider, the slider joined to the magnetic head. By monitoring head loading and unloading stability, substandard HDDs or solid state hybrid drives (SSHD) can be identified and screened out with potential field reliability issues. Embodiments can be used to screen for the stability of the head while on the fly and/or during design and testing to improve overall data storage device reliability. The apparatus, system and methods disclosed may be utilized with disk drive memory systems, and other memory systems utilizing a magnetic reading device, including a HDD and a SSHD. In an embodiment, minimum or no additional hardware costs are incurred for implementation with a data storage device, since shock sensors are commonly used with data storage devices.

Figure 1:
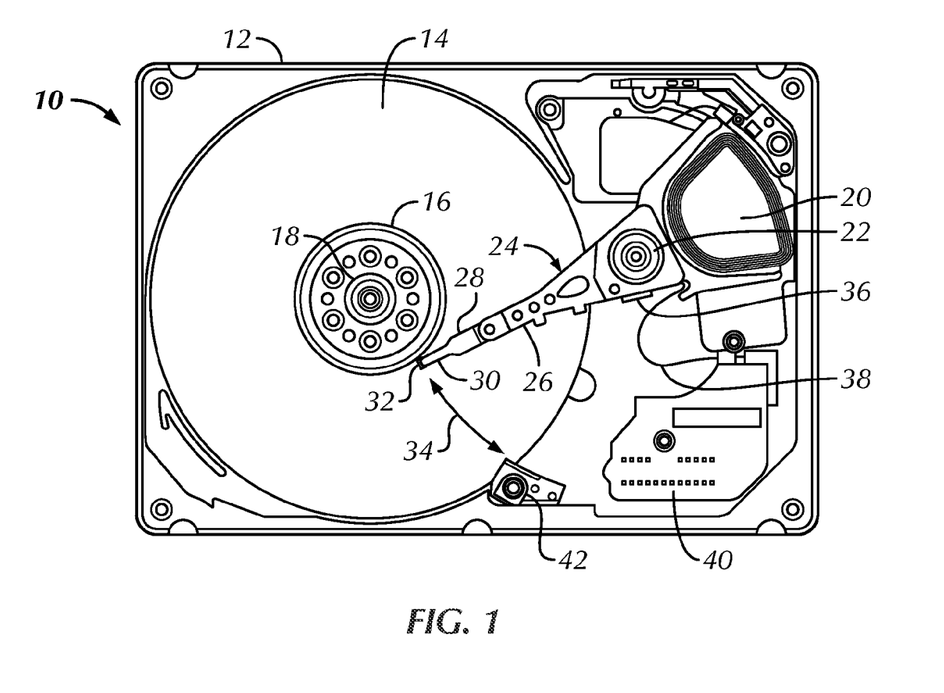
FIG. 1 is a top plan view of a disk drive data storage system in which embodiments are useful.

Referring to the figures wherein identical reference numerals denote the same elements throughout the various views, FIG. 1 illustrates a disk drive storage system 10, in which embodiments are useful. Features of the discussion and claims are not limited to this particular design, which is shown only for purposes of the example. Disk drive 10 includes base plate 12 that may be disposed on a top cover forming a sealed environment to protect internal components from contamination.

Disk drive 10 further includes one or more data storage disks 14 of computer-readable data storage media. Typically, both of the major surfaces of each data storage disk 14 include a plurality of concentrically disposed tracks for data storage purposes. Each data storage disk 14 is mounted on a hub or spindle 16, which in turn is rotatably interconnected with a base plate 12 and/or cover. Multiple data storage disks 14 are typically mounted in vertically spaced and parallel relation on the spindle 16. A spindle motor 18 rotates the data storage disks 14 at an appropriate rate.

The disk drive 10 also includes an actuator arm assembly 24 that pivots about a pivot bearing 22, which in turn is rotatably supported by the base plate 12 and/or cover. The actuator arm assembly 24 includes one or more individual rigid actuator arms 26 that extend out from near the pivot bearing 22. Multiple actuator arms 26 are typically disposed in vertically spaced relation, with one actuator arm 26 being provided for each major data storage surface of each data storage disk 14 of the disk drive 10. Other types of actuator arm assembly configurations may be utilized as well, such as an assembly having one or more rigid actuator arm tips or the like that cantilever from a common structure. Movement of the actuator arm assembly 24 is provided by an actuator arm drive assembly, such as a voice coil motor 20 or the like. The voice coil motor (VCM) 20 is a magnetic assembly that controls the operation of the actuator arm assembly 24 under the direction of control electronics 40.

A suspension 28 is attached to the free end of each actuator arm 26 and cantilevers therefrom. The slider 30 is disposed at or near the free end of each suspension 28. What is commonly referred to as the read/write head (e.g., transducer) is mounted as a head unit 32 under the slider 30 and is used in disk drive read/write operations. As the suspension 28 moves, the slider 30 moves along arc path 34 and across the corresponding data storage disk 14 to position the head unit 32 at a selected position on the data storage disk 14 for the disk drive read/write operations. When the disk drive 10 is not in operation, the actuator arm assembly 24 may be pivoted to a parked position utilizing ramp assembly 42. The head unit 32 is connected to a preamplifier 36 via head wires routed along the actuator arm 26, which is interconnected with the control electronics 40 of the disk drive 10 by a flex cable 38 that is typically mounted on the actuator arm assembly 24. Signals are exchanged between the head unit 32 and its corresponding data storage disk 14 for disk drive read/write operations.

The data storage disks 14 comprise a plurality of embedded servo sectors each comprising coarse head position information, such as a track address, and fine head position information, such as servo bursts. As the head 32 passes over each servo sector, a read/write channel processes the read signal emanating from the head to demodulate the position information. The control circuitry processes the position information to generate a control signal applied to the VCM 20. The VCM 20 rotates the actuator arm 26 in order to position the head over a target track during the seek operation, and maintains the head over the target track during a tracking operation.

The head unit 32 may utilize various types of read sensor technologies such as anisotropic magnetoresistive (AMR), giant magnetoresistive (GMR), tunneling magnetoresistive (TMR), other magnetoresistive technologies, or other suitable technologies.

Magnetic recording is a near-field process in which reading and writing by the read/write head occur in close proximity to the disk surface. Flying height, the distance between the read/write head and the disk surface, is affected by factors including the gram load, the nature of the air bearing surface (ABS), the mounting of the slider on a flexure, the mounting of the head gimbal assembly (HGA) on the head stack assembly (HSA), and the Roll Static Attitude (RSA) of the slider. RSA, a tilting of the slider around the x-axis in a free state before it is flying over the disk, can change during the HSA assembly process. To increase the areal density, it is essential to reduce the average flying height and flying height variations of the sliders that hold the magnetic recording heads. Unintentional alterations of the RSA and y-misalignment during the manufacturing of head stack assemblies change the aerodynamic properties of the air bearing surface and the even distribution of the gram load thereon. RSA and y-misalignment of the sliders can occur during the handling and the swaging process by which the HGA is attached to the actuator. Both can result in flying height variations that can exceed design limits. Therefore, the loading and unloading stability of the head beside the disk surface is a concern, and ensuring that the disk does not come into physical contact with the disk surface during loading and unloading of the head. Additionally, loading instability may cause the head to deviate from a target track on the media. When the head is off track by more than a predetermined amount, a write-unsafe condition exists, wherein application of a write signal in such a condition can damage the data recorded on an adjacent track or cause erroneous reading of data. In an embodiment, a controller monitors head loading and unloading stability utilizing a shock sensor, and when it detects head loading instability then write operations may be aborted to prevent corrupting data recorded in adjacent tracks.

In some embodiments, a head disk interaction (HDI) event is an event wherein the magnetic read and/or write head contacts the media during loading or unloading of the magnetic head beside the media. An HDI event may also include high HGA excitement that may cause head-media contact during head loading or unloading. An HDI event may occur for reason of an unacceptable air bearing surface (ABS), an unacceptable mounting of the slider on a flexure, an unacceptable mounting of the head gimbal assembly (HGA) on the head stack assembly (HSA), and the like. In some embodiments, an HDI event is different than vibration to the HDD or shock to the HDD and consequently to the head, originating external to the HDD from the environment in which the HDD is situated.

Figure 2:
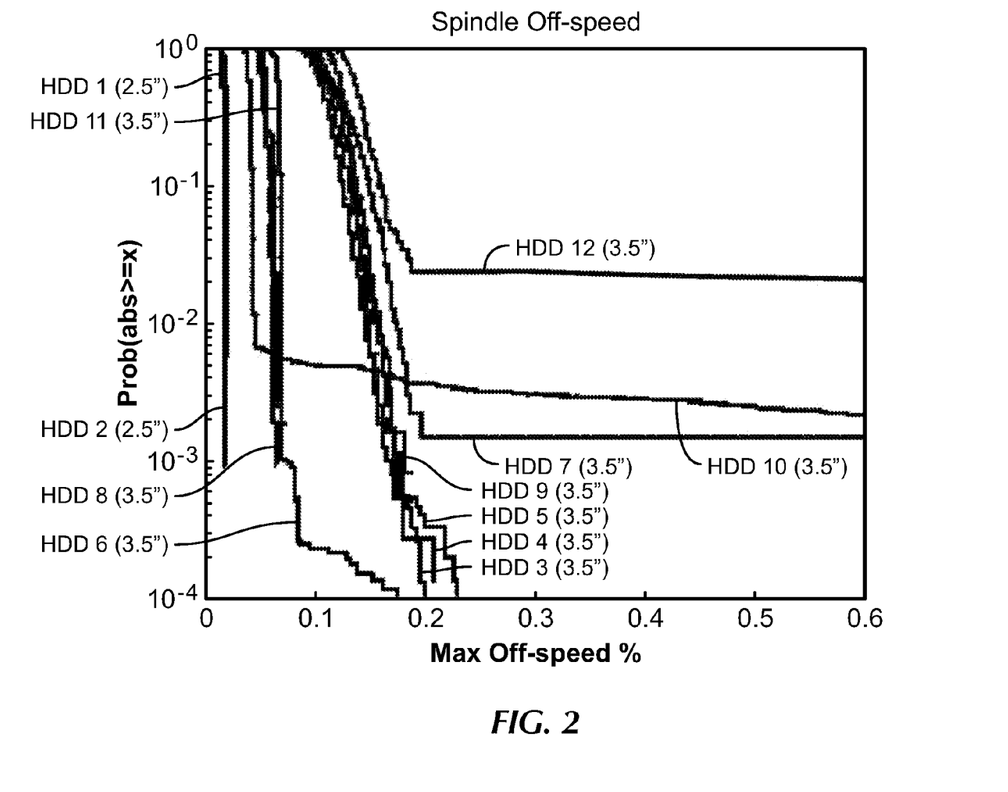
FIG. 2 is a representative graph illustrating experimental data of spindle off-speed distribution comparisons for 2.5" HDDs vs. 3.5" HDDs.

Spindle off-speed error, an unacceptable speed at which the spindle rotates when the data storage disk is not being read or written to, may be used to detect HDDs with magnetic heads experiencing load and unload (L/UL) stability failure. However, there are limitations to using spindle off-speed error for this purpose. Spindle off-speed error relies on a head-media interaction to alter the spindle speed, which may not occur. The spindle off-speed error method also cannot be universally applied to all drives. For example, a 2.5" HDD spindle has a smaller moment of inertia than a 3.5" HDD and the spindle speed variation of a 3.5" HDD spindle is less sensitive to head disk interaction (HDI). FIG. 2 shows a spindle off-speed distribution comparison for 2.5" HDDs vs. 3.5" HDDs. As illustrated, spindle off-speed error for 3.5" HDDs is not sufficiently sensitive to detect HDDs with heads experiencing load and unload (L/UL) stability failure. Additionally, the spindle off-speed error is an indirect HDI measurement, since many additional factors can cause spindle off-speed. Moreover, the spindle off-speed error method necessitates using a power large scale integrated (PLSI) circuit motor control algorithm.

Figure 3:
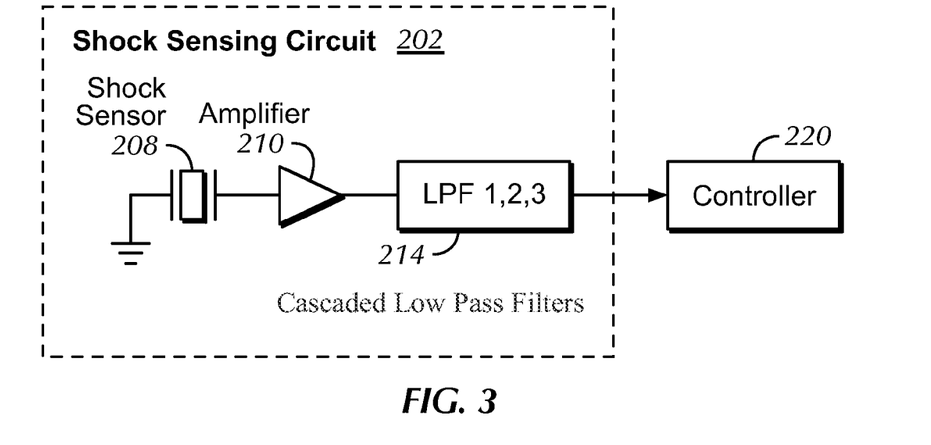
FIG. 3 is a schematic representation of a shock sensing circuit including circuitry for modifying a signal from a shock sensor, as can be used in a data storage system as in FIG. 1, in an embodiment.

Referring now to FIG. 3, a shock sensing circuit 202 is illustrated that may be used with a data storage system, e.g., a HDD, according to an embodiment. Shock sensing circuit 202 includes circuitry for modifying a signal from shock sensor 208. Shock sensor 208 detects shock during preloading of the magnetic head beside the recording media, during loading of the magnetic head beside the recording media, during pre-unloading of the magnetic head from the recording media, and during unloading of the magnetic head from the recording media. Head loading and unloading as discussed herein may include various data storage device designs including a head loading from a ramp to media, and a head loading to a media track from a parked position other than from a ramp. In an embodiment, shock sensing circuit 202 includes a suitable sensor 208 (e.g., an accelerometer), an amplifier 210 for amplifying the output of the shock sensor signal, and a low pass filter 214. Low pass filter 214 is illustrated as cascaded low pass filters, although other filter designs may be utilized. In an embodiment, the sensitivity of shock sensor 208 is adjusted by increasing or decreasing a bandwidth of low pass filter 214. Alternatively, or additionally, the sensitivity of shock sensor 208 is adjusted by increasing or reducing a gain of amplifier 210.

In an embodiment, a controller 220 receives the shock sensor signal, via amplifier 210, and low pass filter 214, and compares the signal to a predetermined threshold value, determining whether the shock sensor signal exceeds a predetermined threshold limit. In this way, controller 220 can monitor the level of magnetic head load and unload stability relative to a threshold value. In an embodiment, controller 220 periodically resets the threshold limit value to account for a change in operating conditions that may be experienced by the data storage system. In an alternative embodiment, a controller receives the shock sensor signal without having had the sensitivity of the shock sensor adjusted. Here, for example, an amplifier and low pass filter are not utilized, and the controller directly receives the shock sensor signal. In an embodiment, a voice coil motor (VCM) is utilized that, when generates a predetermined VCM current signature, triggers controller 220 to monitor the shock sensor 208 shock detection signal.

In an embodiment, controller 220 monitors the loading and unloading stability of the magnetic head by determining magnitude of the shock sensor signal, comparing the shock sensor signal magnitude with a predetermined shock threshold limit, and determining whether the shock sensor signal magnitude exceeds the predetermined shock threshold limit. Alternatively, or additionally, controller 220 monitors the loading and unloading stability of the magnetic head by determining magnitude of the shock sensor signal using a recursive root-mean square (RMS) value measured in the time domain, comparing the shock sensor signal RMS value with the predetermined shock threshold limit, and determining whether the shock sensor signal RMS value exceeds the predetermined shock threshold limit. Alternatively, or additionally, controller 220 monitors the loading and unloading stability of the magnetic head by determining variance of the shock sensor signal, comparing the shock sensor signal variance with the predetermined shock threshold limit, and determining whether the shock sensor variance exceeds the predetermined shock threshold limit. Alternatively, or additionally, controller 220 monitors the loading and unloading stability of the magnetic head by determining spectrum of the shock sensor signal, comparing a fast Fourier transform (FFT) of the shock sensor signal with the predetermined shock threshold limit, and determining whether the FFT of the shock sensor signal exceeds the predetermined shock threshold limit.

In an embodiment, controller 220 tracks a shock sensor signal that exceeds the predetermined shock threshold limit during a predetermined time period. Controller 220 also tracks head loading cycles during the predetermined time period, and determines a percentage of shock sensor signals that exceed the predetermined shock threshold limit relative to head load cycles.

Figure 4:
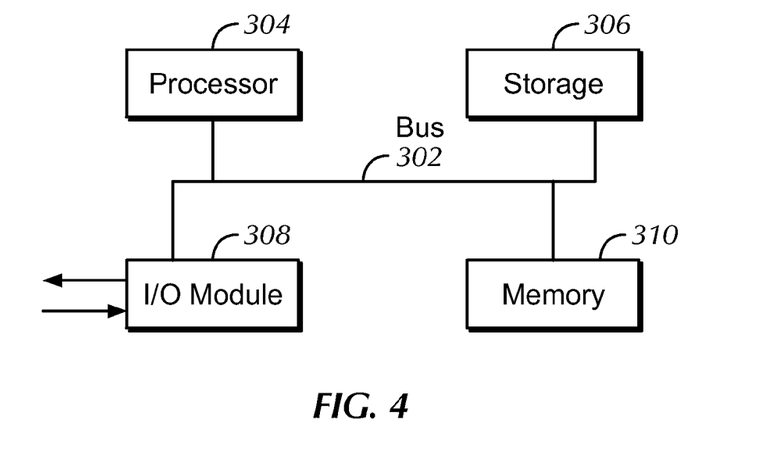
FIG. 4 is a sectional view representation illustrating components of a controller, in an embodiment.

Turning now to FIG. 4, components of controller 220 (FIG. 3) are illustrated, in an embodiment. Controller 220 includes processor module 304, storage module 306, input/output (I/O) module 308, memory module 310, and bus 302. Although controller 220 is illustrated with these modules, other suitable arrangements (e.g., having more or less modules) known to those of ordinary skill in the art may be used. For example, controller 220 may be a logic implemented state machine or a programmable logic controller.

In an embodiment, the methods described herein are executed by controller 220. Specifically, processor module 304 executes one or more sequences of instructions contained in memory module 310 and/or storage module 306. In one example, instructions may be read into memory module 310 from another machine-readable medium, such as storage module 306. In another example, instructions may be read directly into memory module 310 from I/O module 308, for example from an operator via a user interface. Information may be communicated from processor module 304 to memory module 310 and/or storage module 306 via bus 302 for storage. In an example, the information may be communicated from processor module 304, memory module 310, and/or storage module 306 to I/O module 308 via bus 302. The information may then be communicated from I/O module 308 to an operator via the user interface.

Memory module 310 may be random access memory or other dynamic storage device for storing information and instructions to be executed by processor module 304. In an example, memory module 310 and storage module 306 are both a machine-readable medium.

In an embodiment, processor module 304 includes one or more processors in a multi-processing arrangement, where each processor may perform different functions or execute different instructions and/or processes contained in memory module 310 and/or storage module 306. For example, one or more processors may execute instructions for comparing the shock sensor signal with a predetermined shock threshold limit determining whether the shock sensor signal exceeds the predetermined shock threshold limit, and one or more processors may execute instructions for input/output functions. Also, hard-wired circuitry may be used in place of or in combination with software instructions to implement various example embodiments. Thus, embodiments are not limited to any specific combination of hardware circuitry and software.

The term "circuit" or "circuitry" as used herein includes all levels of available integration, for example, from discrete logic circuits to the highest level of circuit integration such as VLSI, and includes programmable logic components programmed to perform the functions of embodiments as well as general-purpose or special-purpose processors programmed with instructions to perform those functions.

Bus 302 may be any suitable communication mechanism for communicating information. Processor module 304, storage module 306, I/O module 308, and memory module 310 are coupled with bus 302 for communicating information between any of the modules of controller 220 and/or information between any module of controller 220 and a device external to controller 220. For example, information communicated between any of the modules of controller 220 may include instructions and/or data.

The term "machine-readable medium" as used herein, refers to any medium that participates in providing instructions to processor module 304 for execution. Such a medium may take many forms, including, but not limited to, non-volatile media, and volatile media. Non-volatile media includes, for example, optical or magnetic disks, such as storage module 306. Volatile media includes dynamic memory, such as memory module 310. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

In an embodiment, a non-transitory machine-readable medium is employed including executable instructions for monitoring the loading and unloading stability of a magnetic head for a data storage system. The instructions include code for monitoring loading stability of a magnetic head by utilizing a signal from a shock sensor. The shock sensor detects shock during preloading of the magnetic head beside the recording media, and/or loading of the magnetic head beside recording media, and/or pre-unloading of the magnetic head from recording media, and/or unloading of the magnetic head from recording media. In an embodiment, the non-transitory machine-readable medium utilizes a predetermined voice coil motor (VCM) current signature to trigger monitoring the shock sensor signal.

In an embodiment, the non-transitory machine-readable medium includes executable instructions for determining magnitude of the shock sensor signal, comparing the shock sensor signal magnitude with a predetermined shock threshold limit, and determining whether the shock sensor signal magnitude exceeds the predetermined shock threshold limit. Alternatively, or additionally, the machine-readable medium includes executable instructions for determining magnitude of the shock sensor signal using a recursive root-mean square (RMS) value measured in the time domain, comparing the shock sensor signal RMS value with the predetermined shock threshold limit, and determining whether the shock sensor signal RMS value exceeds the predetermined shock threshold limit. Alternatively, or additionally, the machine-readable medium includes executable instructions for determining variance of the shock sensor signal, comparing the shock sensor signal variance with the predetermined shock threshold limit, and determining whether the shock sensor variance exceeds the predetermined shock threshold limit. Alternatively, or additionally, the machine-readable medium includes executable instructions for determining spectrum of the shock sensor signal, comparing a fast Fourier transform (FFT) of the shock sensor signal with the predetermined shock threshold limit, and determining whether the FFT of the shock sensor signal exceeds the predetermined shock threshold limit.

In an embodiment, the non-transitory machine-readable medium tracks shock sensor signals that exceed the predetermined shock threshold limit during a predetermined time period. The non-transitory machine-readable medium also tracks head loading cycles during the predetermined time period, and determines a percentage of shock sensor signals that exceed the predetermined shock threshold limit relative to head load cycles. In an embodiment, the non-transitory machine-readable medium utilizes the shock sensor signal to determine a desired pitch static attitude (PSA) and roll static attitude (RSA) of a slider. In an embodiment, the non-transitory machine-readable medium includes executable instructions for monitoring the loading and unloading stability of the magnetic head during a head gimbal assembly (HGA) loading quality back-end test, or during a HGA or head stack assembly (HSA) component test.

Figure 5:
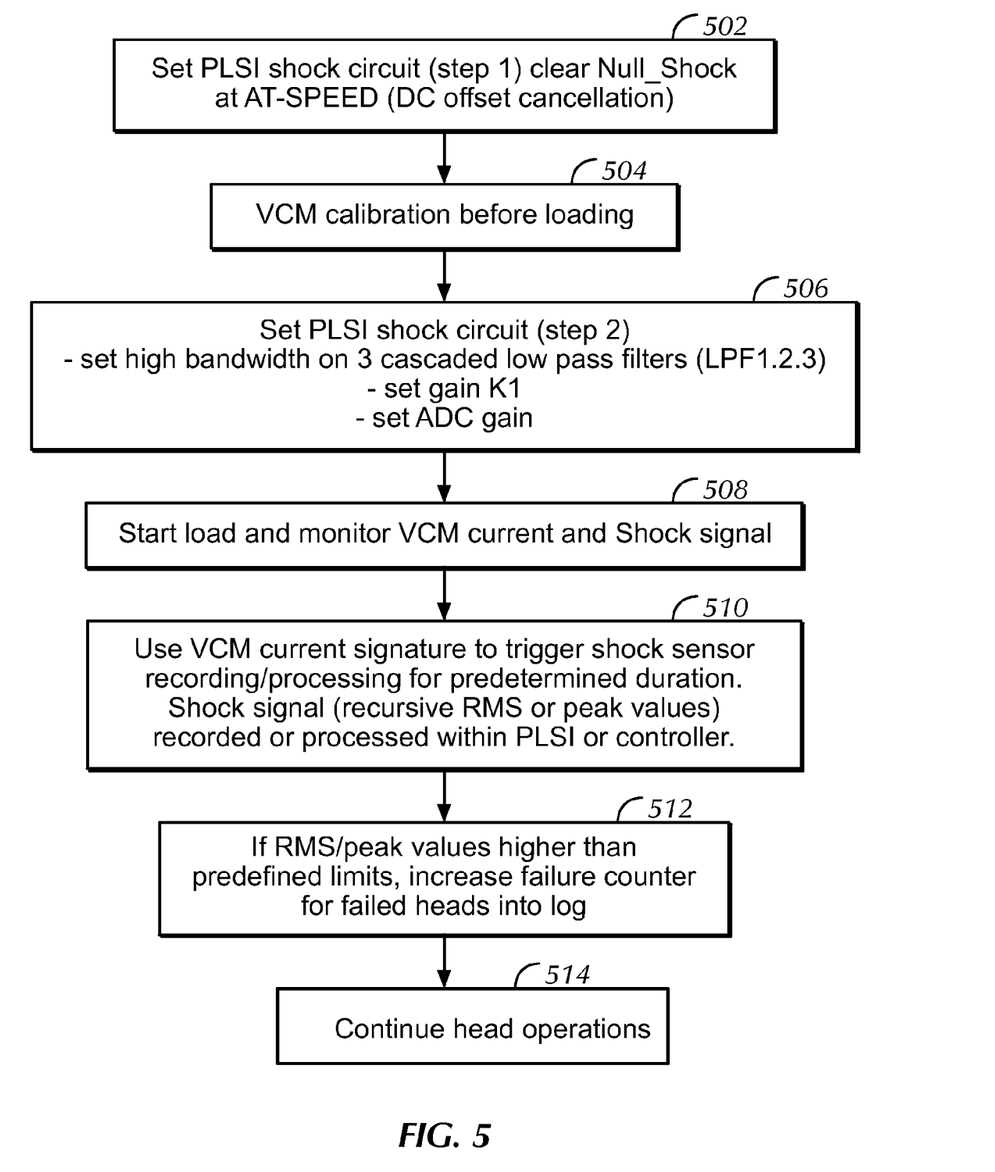
FIG. 5 is a flow diagram illustrating a method or process for monitoring loading and unloading stability of a magnetic head, and modifying and utilizing a signal from a shock sensor, in an embodiment.

FIG. 5 illustrates a method and process for monitoring loading and unloading stability of a magnetic head, in embodiment. The method provides a check for head-media interaction and/or contact, as well as a check for an unstable air bearing surface (ABS), the mounting of the slider on a flexure, the mounting of the head gimbal assembly (HGA) on the head stack assembly (HSA), and high HGA excitement during loading and unloading. In an embodiment, the method is also used to determine a desired pitch static attitude (PSA) and roll static attitude (RSA) of a slider, for various air bearing surface and suspension combinations. In an embodiment, the monitoring of the loading and unloading stability of the magnetic head is performed during a head gimbal assembly (HGA) loading quality back-end test, or during a HGA or head stack assembly (HSA) component test.

It will be understood that each step in the flowchart illustration can be implemented by computer program instructions. These computer program instructions may be provided to a processor of a programmable data processing apparatus, such that the instructions execute via the processor to implement the functions or actions specified in the flowchart. The instructions may be executed by controller, as described above. In an embodiment, the controller is a component of a HDD. In an alternative embodiment, the controller is separate from the HDD and may be connected to the HDD to externally monitor and communicate with the HDD.

As shown, in an embodiment, the controller causes and executes changes made to the current magnetic head loading process, including changes made to the shock sensor signal. As detailed in step 502, a DC component is typically included in the shock sensor signal at HDD powerup. A DC offset cancellation is utilized for a limited time during powerup. The DC offset cancellation is later canceled at an appropriate time, as may be determined by a feedback loop. Next, as stated in step 504, VCM calibration is executed prior to loading the magnetic head.

Step 506 illustrates that the shock sensor signal is tuned to adjust the sensitivity of the signal. In an embodiment, the shock sensor signal bandwidth is increased, to detect high frequency HDI events, by a predetermined amount prior to loading the magnetic head, by utilizing a low pass filter. In an embodiment, cascaded low pass filters LPF 1, 2, 3 are utilized to reduce unwanted signal noise. It is to be appreciated, however, that the order of the low pass filter utilized may vary depending on the head suspension or other components or considerations. Alternatively, or additionally, the sensitivity of the shock sensor signal is adjusted by reducing the gain of an amplifier by a predetermined amount prior to loading the magnetic head. As an example, a higher bandwidth and lower gain is employed during head loading, relative to a time period when the head is not loading. As an example, during head nonloading, LPF1, LPF2 and LPF3 are set at 2 KH, 4 KH, and 4 KH, respectively. Gain K1 is set at 4 volts/volt. However, when monitoring head unloading and/or loading stability, LPF1, LPF2 and LPF3 are set at 8 KH, 16 KH, and 16 KH, respectively, for unloading, and 32 KH, 32 KH, and 32 KH, respectively, for loading, and gain K1 is set at 3 volts/volt.

Next, as stated in step 508, the loading and unloading of the magnetic head occurs, the shock signal is monitored, and optionally the voice coil motor (VCM) current is monitored. More specifically, the shock signal is monitored during preloading of the magnetic head beside the recording media, and/or during loading of the magnetic head beside recording media, and/or during pre-unloading of the magnetic head from recording media, and/or during unloading of the magnetic head from recording media.

Monitoring the shock signal during preloading provides a baseline signal to differentiate between a vibration environment (not due to head loading instability) versus head loading instability. That is, the preloading baseline signal is compared with the shock signal obtained during head loading. If, for example the preloading baseline shock signal is unacceptable, then an unacceptable head loading shock signal does not necessarily indicate unacceptable head loading stability. Similarly, monitoring the shock signal during pre-unloading provides a baseline signal to differentiate between a vibration environment versus head unloading instability.

As stated in step 510, a predetermined voice coil motor (VCM) current signature may optionally be utilized to trigger the monitoring and/or recording of the shock sensor signal. In an embodiment, a controller is utilized to determine whether the shock sensor signal exceeds the predetermined threshold limit. In an embodiment, the shock sensor signal is utilized to determine a desired pitch static attitude (PSA) and roll static attitude (RSA) of a slider.

In an embodiment, shock sensor signals are tracked that exceed the predetermined shock threshold limit during a predetermined time period. Head loading cycles are tracked during the predetermined time period, and a percentage of shock sensor signals that exceed the predetermined shock threshold limit relative to head load cycles is determined.

In an embodiment, a magnitude of the shock sensor signal is determined. The shock sensor signal magnitude is compared with a predetermined shock threshold limit, and a determination is made whether the shock sensor signal magnitude exceeds the predetermined shock threshold limit. Alternatively, or additionally, the magnitude of the shock sensor signal is determined, using a recursive root-mean square (RMS) value measured in the time domain. The shock sensor signal RMS value is compared with the predetermined shock threshold limit, and a determination is made whether the shock sensor signal RMS value exceeds the predetermined shock threshold limit. Alternatively, or additionally, the variance of the shock sensor signal is determined. The shock sensor signal variance is compared with the predetermined shock threshold limit, and a determination is made whether the shock sensor variance exceeds the predetermined shock threshold limit. Alternatively, or additionally, the spectrum of the shock sensor signal is determined. A fast Fourier transform (FFT) of the shock sensor signal is compared with the predetermined shock threshold limit, and a determination is made whether the FFT of the shock sensor signal exceeds the predetermined shock threshold limit.

In an embodiment, piezoelectric transducer (PZT) induced voltage on a head gimbal assembly (HGA) is monitored during preloading of the magnetic head beside the recording media, and/or loading of the magnetic head beside recording media, and/or pre-unloading of the magnetic head from recording media, and/or unloading of the magnetic head from recording media. In an embodiment, the spindle speed is also monitored during preloading of the magnetic head beside the recording media, and/or loading of the magnetic head beside recording media, and/or pre-unloading of the magnetic head from recording media, and/or unloading of the magnetic head from recording media.

Next, as stated in step 512, if the RMS value (or magnitude, variance, or FFT value) are higher than a predetermined threshold, an unstable load counter is increased. The unstable load count may be used to determine head loading and unloading stability. The number of data storage devices with an unstable loading and/or unloading may be logged. This information can be used during the HDD manufacture process. Additionally, for drives integrated into customer systems, head loading and unloading may be monitored and an unstable load can register and increase an unstable load counter. The controller can monitor the unstable load occurrences, and provide a warning before head failure.

As stated in step 514, the operation of the magnetic head continues with read and write operations.

Turning now to representative graphs, experimental data is provided to illustrate comparisons of an example embodiment. Features of the discussion and claims are not limited to the example embodiment, which is used only for purposes of the example data.

Figure 6:
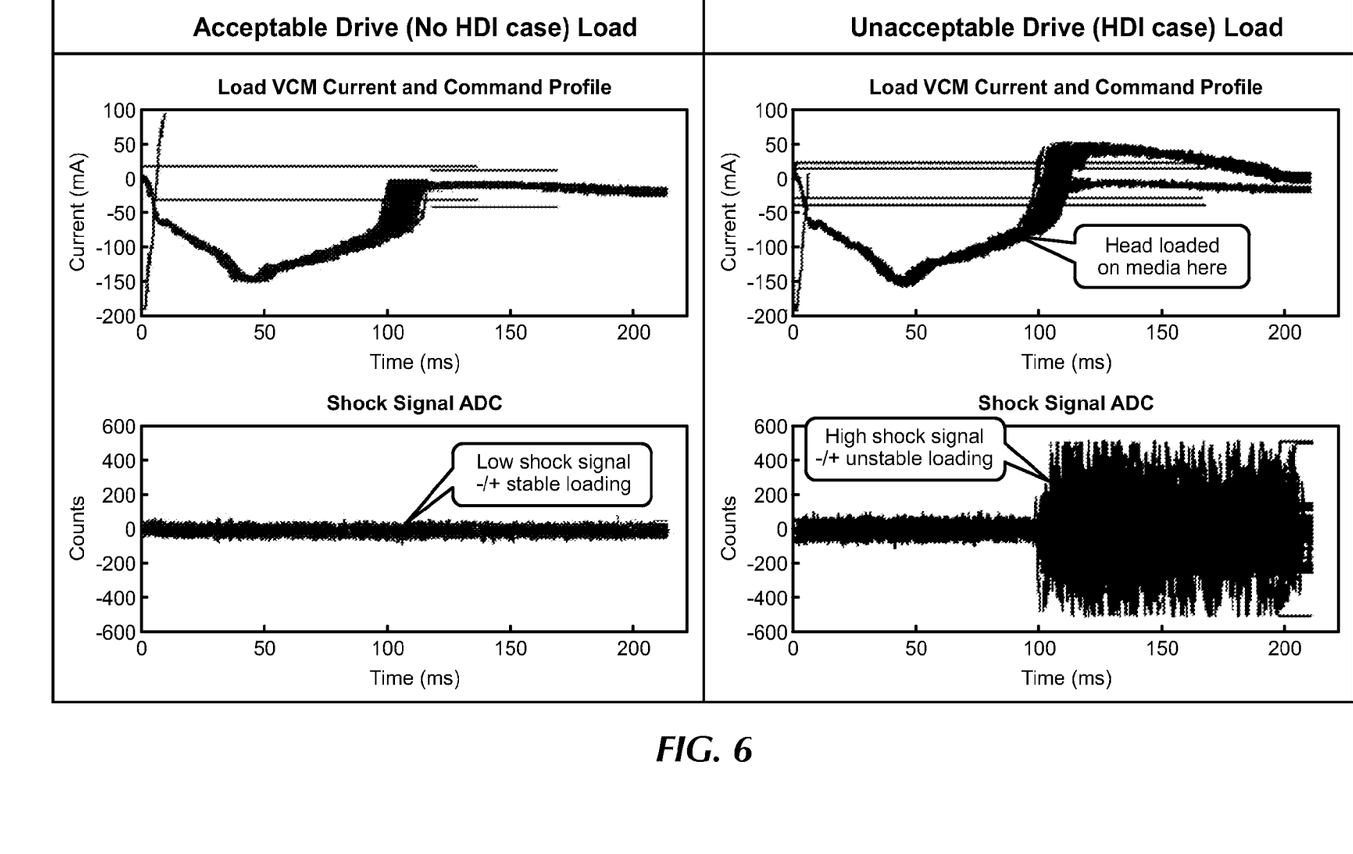
FIG. 6 is a representative graph illustrating experimental data of VCM current and shock sensor signals as captured by a controller, in an embodiment.

Referring to FIG. 6, a representative graph illustrates experimental data showing VCM current and shock sensor signals as may be monitored by a controller, in accordance with an embodiment. The data tracing sample time is 1 ms.

The top left and top right graphs illustrate HDD VCM current during preloading and loading of a magnetic head from a ramp outside diameter crash stop (ODCS) to beside media. The VCM current identifies the head load timing signature. The top left graph illustrates that current rises from about −100 mA to 0 mA when the head loads beside media. The top right graph illustrates that current rises from about −70 mA to 50 mA when the head loads beside the media. A larger VCM current slope is detected with the top right graph as compared to the top left graph, when the head is loaded beside the media.

The bottom left and bottom right graphs illustrate shock sensor signal traces as monitored by a controller during preloading and loading of a magnetic head from a ramp outside diameter crash stop (ODCS) to beside media. The bottom left graph illustrates stable and steady head ABS flight when the head loads beside the media (no HDI case). The signal remains steady through the indicated time when the head is loaded beside the media. The bottom right graph illustrates unstable head ABS flight when the head loads beside media (an unacceptable HDI case). A noisy signal is illustrated at the time when the head is loaded beside the media. The bottom right graph illustrates a HDD with an air bearing surface that does not provide a stable fly condition for the head, resulting in an excited head gimbal assembly causing a noisy shock sensor signal, and possibly head-media interaction or contact. The controller detects this apparent difference between the HDD with acceptable loading, and the HDD with unacceptable loading.

Figure 7:
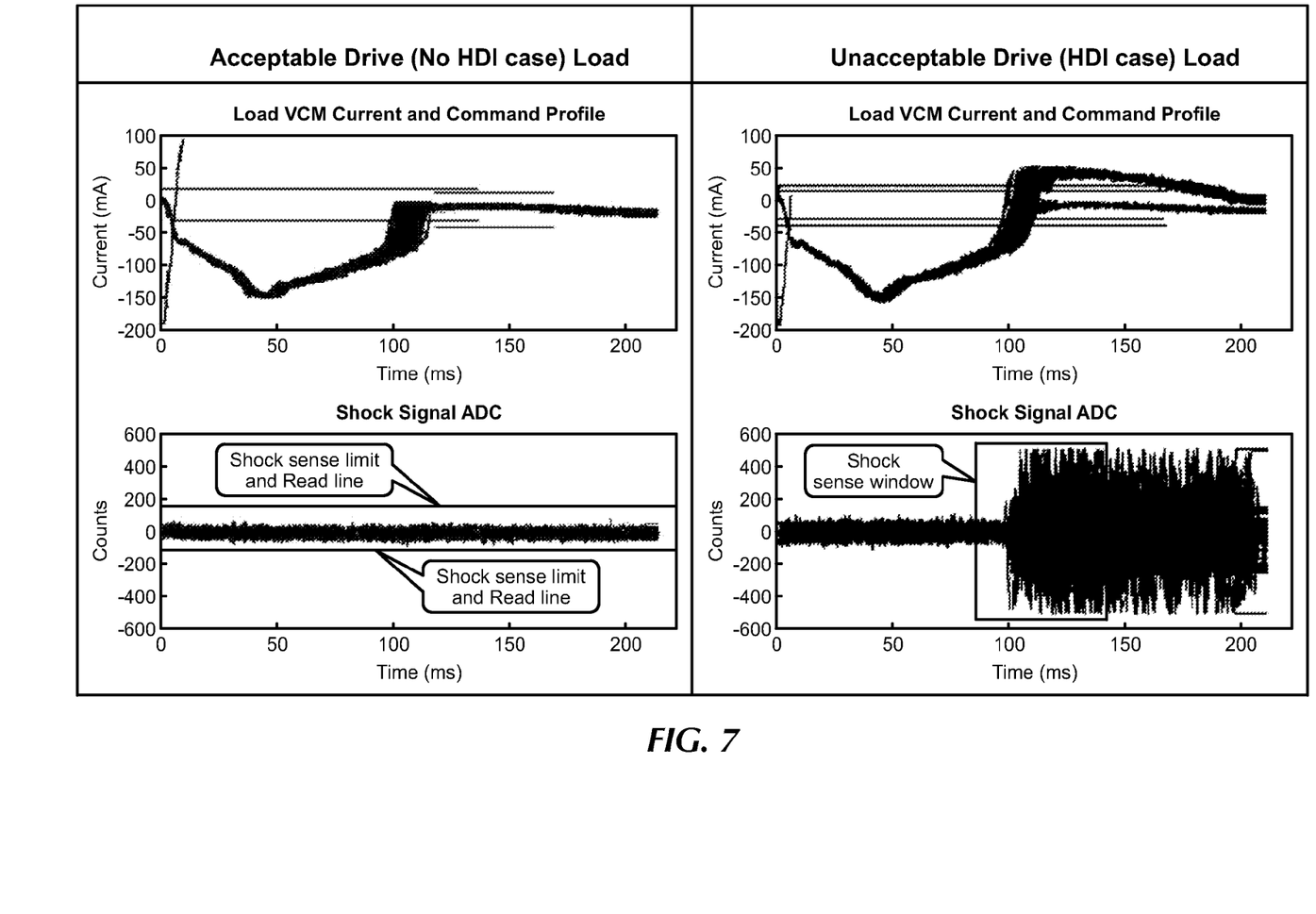
FIG. 7 is another representative graph illustrating experimental data of VCM current and shock sensor signals, as well as shock sensor signal threshold limits and a shock sense window of a magnetic head loading moment, in an embodiment.

FIG. 7 is another representation of the FIG. 6 graph, illustrating experimental data showing VCM current and shock sensor signals. In addition, shock sensor signal threshold limits are illustrated, as well as a shock sense window of the magnetic head loading moment. These limits and window are illustrated to describe detection algorithms employed by the controller in real-time monitoring of the head loading.

Several methods are described herein to monitor for and detect unstable head ABS flight when the head loads beside media (an unacceptable HDI case). One example detection algorithm employed by the controller in real-time monitoring is magnitude detection. The upper and lower read lines illustrate predetermined threshold shock sensor signal limits. The shock sense window represents the moment in time that the head is loading beside the media. If the magnitude of the shock sensor signal exceeds the threshold limit read lines, a counter increments. If a predetermined number of sensor signal counts exceed a threshold count limit, the controller registers an unacceptable HDI case. In an alternative example, the controller employs magnitude detection utilizing recursive RMS values measured in a time domain. In an alternative example, the controller employs variance detection. Variance detection determines the square of the shock sensor signals that exceed the threshold limit read lines. Again, this detection algorithm is employed by the controller in real-time monitoring of the head loading. If a predetermined number variation counts exceed a threshold count limit, the controller registers an unacceptable HDI case.

In an embodiment, one variance is determined from the beginning of the head loading to the end of the head loading, and a second variance is determined from the end of the head loading to when the head is positioned at a chosen position over the media. These two variances are compared by the controller to determine whether a threshold limit is exceeded. For example, one shock sense window is assigned from about 80 ms to 140 ms (the shock sense window illustrated in FIG. 7), and a second shock sense window is assigned from 0 to 79 ms (the time period prior to loading the head beside the media). The two windows are then compared by the controller, a variance is determined, and a determination is made whether the variance exceeds a threshold limit.

Figure 8:
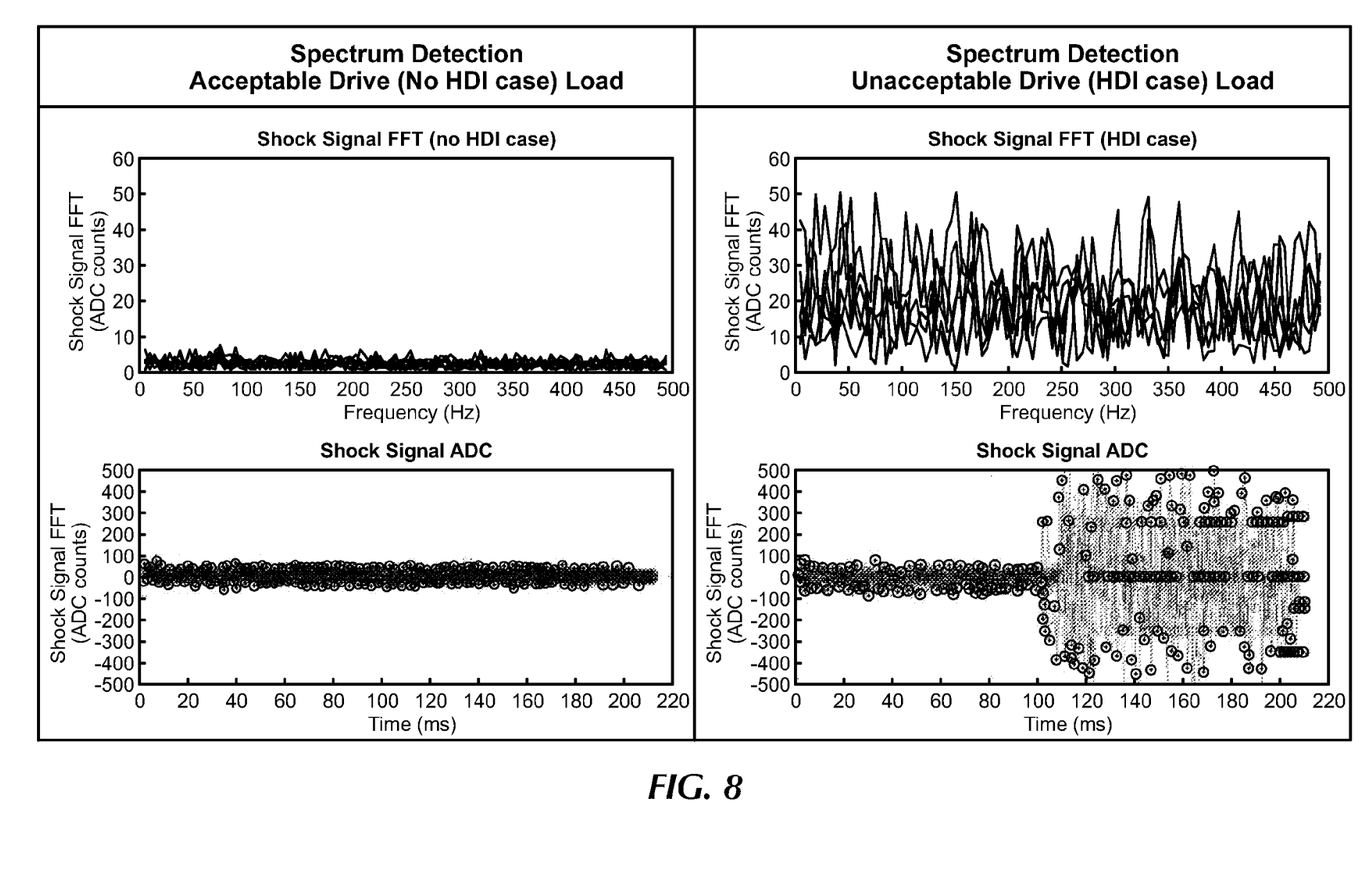
FIG. 8 is a representative graph illustrating experimental data of a shock sensor signal shown in frequency and time domains, for data storage devices with no HDI event and an unacceptable HDI event, in an embodiment.

Referring to FIG. 8, a representative graph illustrates experimental data showing a shock sensor signal for a data storage device with no HDI event, and a shock sensor signal for a data storage device with an unacceptable HDI event. In an embodiment, a controller employing spectrum detection monitors the shock sensor signal and determines the fast Fourier transform (FFT) from the signal. The top and bottom graphs show the same signal, but in different domains. The top graphs show the shock sensor signal in the frequency domain. The bottom graphs show the shock sensor signal in the time domain. As illustrated, a larger band noise floor occurs in the case of an unacceptable HDI case (top and bottom graphs on the right-hand side).

Figure 9:
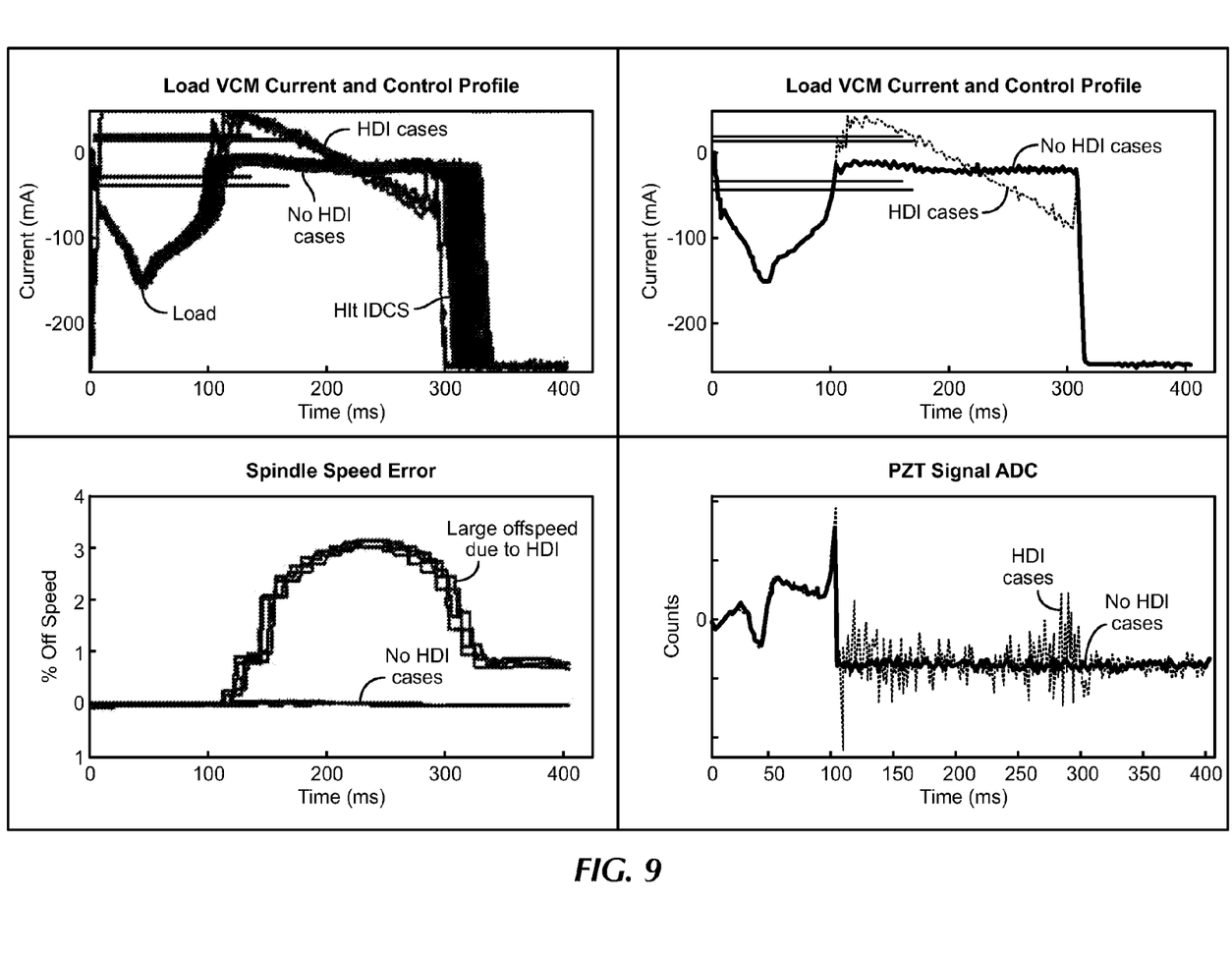
FIG. 9 is a representative graph illustrating experimental data of VCM current, spindle offspeed, and shock sensor signals, as well as PZT induced voltage signals, for data storage devices with no HDI event and an unacceptable HDI event, in an embodiment.

FIG. 9 is a representative graph illustrating experimental data showing VCM current, spindle offspeed, and shock sensor signals, as well as PZT induced voltage signals, for data storage devices with no HDI event and an unacceptable HDI event. In an embodiment, signals in addition to the shock sensor signal (e.g., PZT induced voltage on a head gimbal assembly (HGA)) are utilized to further monitor the head loading and unloading stability.

The top left-hand side graph shows VCM current for a data storage device with no HDI event, as well as a data storage device with an unacceptable HDI event. As illustrated, a data storage device with an unacceptable HDI event shows a VCM current with a large slope after head loading. Whereas, a data storage device with no HDI event shows a VCM current with flat or substantially same current after head loading. In an embodiment, this pattern is monitored and detected by a controller.

The bottom left-hand side graph shows spindle offspeed for a data storage device with no HDI event, as well as a data storage device with an unacceptable HDI event. As illustrated, a data storage device with an unacceptable HDI event shows a large offspeed curve after head loading. Whereas, a data storage device with no HDI event shows a flat or substantially same offspeed after head loading.

The top right-hand side graph shows VCM current for a data storage device with no HDI event, as well as a data storage device with an unacceptable HDI event. As illustrated, a data storage device with an unacceptable HDI event shows a VCM current with a large slope after head loading. Whereas, a data storage device with no HDI event shows a VCM current with flat or substantially same current after head loading.

The bottom right-hand side graph shows a piezoelectric transducer (PZT) induced voltage signal for a data storage device with no HDI event, as well as a data storage device with an unacceptable HDI event. As illustrated, the data storage device with the unacceptable HDI event shows a noisy count signal after head loading. In an embodiment, if the signal exceeds a threshold limit, a counter increments. If a predetermined number of signal counts exceed a threshold count limit, the controller registers an unacceptable HDI case.

A shock sensor signal can better differentiate than a PZT induced voltage signal on a head gimbal assembly (HGA) between a vibration environment or a shock event (not due to head loading instability) versus head loading instability. A shock sensor signal of the preloaded head can provide a clear baseline signal, with increased current after head loading. Whereas, a PZT induced voltage signal on a head gimbal assembly (HGA) does not provide a clear baseline signal during head preloading. If, for example a preloading baseline shock signal is unacceptable, then an unacceptable head loading shock signal does not necessarily indicate unacceptable head loading stability. An embodiment clearly differentiates between a vibration environment or a shock event from head loading instability.

Modifications and variations may be made to the disclosed embodiments while remaining within the spirit and scope of the method, system and apparatus. The implementations described above and other implementations are within the scope of the following claims.

We claim:

1. An apparatus for monitoring at least one of loading stability and unloading stability of a magnetic head beside recording media, for a data storage system, the apparatus comprising:
   a magnetic head;
   a shock sensor to detect shock during at least one of i.) preloading of the magnetic head beside the recording media, ii.) loading of the magnetic head beside the recording media, iii.) pre-unloading of the magnetic head from the recording media, and iv.) unloading of the magnetic head from the recording media; and
   a controller to monitor a shock detection signal from the shock sensor, and to determine whether the shock detection signal exceeds a predetermined threshold for pitch static attitude (PSA) and roll static attitude (RSA) of a slider joined to the magnetic head.

2. The apparatus as in claim 1, wherein the shock sensor comprises a shock sensing circuit including an amplifier and a filter, wherein the sensitivity of the shock sensing circuit is configurable by at least one of: i.) adjusting a bandwidth of the filter, and ii.) adjusting a gain of the amplifier.

3. The apparatus as in claim 1, further comprising a voice coil motor (VCM) that, when generates a predetermined current signature, triggers the controller to monitor the shock sensor shock detection signal.

4. The apparatus as in claim 1, wherein the controller monitors the stability of the magnetic head by at least one of:
   i.) determining magnitude of the shock sensor signal, comparing the shock sensor signal magnitude with the predetermined shock threshold limit, and determining whether the shock sensor signal magnitude exceeds the predetermined shock threshold limit;
   ii.) determining magnitude of the shock sensor signal using a recursive root-mean square (RMS) value measured in the time domain, comparing the shock sensor signal RMS value with the predetermined shock threshold limit, and determining whether the shock sensor signal RMS value exceeds the predetermined shock threshold limit;
   iii.) determining variance of the shock sensor signal, comparing the shock sensor signal variance with the predetermined shock threshold limit, and determining whether the shock sensor variance exceeds the predetermined shock threshold limit; and
   iv.) determining spectrum of the shock sensor signal, comparing a fast Fourier transform (FFT) of the shock sensor signal with the predetermined shock threshold limit, and determining whether the FFT of the shock sensor signal exceeds the predetermined shock threshold limit.

5. The apparatus as in claim 1, wherein the controller: i.) tracks a shock sensor signal that exceeds the predetermined shock threshold limit during a predetermined time period, ii.) tracks head loading or unloading cycles during the predetermined time period, and iii.) determines a percentage of shock sensor signals that exceed the predetermined shock threshold limit relative to head load or unload cycles.

6. A non-transitory machine-readable medium including executable instructions for monitoring a data storage system, the instructions comprising code for:
   monitoring at least one of loading stability and unloading stability of a magnetic head beside recording media, by determining whether a signal from a shock sensor exceeds a predetermined pitch static attitude (PSA) and roll static attitude (RSA) threshold of a slider joined to the magnetic head, wherein the shock sensor detects shock during at least one of i.) preloading of the magnetic head beside the recording media, ii.) loading of the magnetic head beside the recording media, iii.) pre-unloading of the magnetic head from the recording media, and iv.) unloading of the magnetic head from the recording media.

7. The non-transitory machine-readable medium as in claim 6, further comprising utilizing a predetermined current signature from a voice coil motor (VCM) to trigger monitoring the shock sensor signal.

8. The non-transitory machine-readable medium as in claim 6, wherein monitoring the stability of the magnetic head comprises at least one of:
   i.) determining magnitude of the shock sensor signal, comparing the shock sensor signal magnitude with a predetermined shock threshold limit, and determining whether the shock sensor signal magnitude exceeds the predetermined shock threshold limit;
   ii.) determining magnitude of the shock sensor signal using a recursive root-mean square (RMS) value measured in the time domain, comparing the shock sensor signal RMS value with the predetermined shock threshold limit, and determining whether the shock sensor signal RMS value exceeds the predetermined shock threshold limit;
   iii.) determining variance of the shock sensor signal, comparing the shock sensor signal variance with the predetermined shock threshold limit, and determining whether the shock sensor variance exceeds the predetermined shock threshold limit; and
   iv.) determining spectrum of the shock sensor signal, comparing a fast Fourier transform (FFT) of the shock sensor signal with the predetermined shock threshold limit, and determining whether the FFT of the shock sensor signal exceeds the predetermined shock threshold limit.

9. The non-transitory machine-readable medium as in claim 6, further comprising:
   i.) tracking shock sensor signals that exceed a predetermined shock threshold limit during a predetermined time period, ii.) tracking head loading or unloading cycles during the predetermined time period, and iii.) determining a percentage of shock sensor signals that exceed the predetermined shock threshold limit relative to head load or unload cycles.

10. The non-transitory machine-readable medium as in claim 6, wherein
    monitoring the stability of the magnetic head is performed during a head gimbal assembly (HGA) loading or unloading quality back-end test, or during a HGA or head stack assembly (HSA) component test.

11. A method for a data storage system comprising:
    monitoring at least one of loading stability and unloading stability of a magnetic head beside recording media, by determining whether a signal from a shock sensor exceeds a predetermined pitch static attitude (PSA) and roll static attitude (RSA) threshold of a slider joined to the magnetic head, wherein the shock sensor detects shock during at least one of i.) preloading of the magnetic head beside the recording media, ii.) loading of the magnetic head beside the recording media, iii.) pre-unloading of the magnetic head from the recording media, and iv.) unloading of the magnetic head from the recording media.

12. The method as in claim 11, further comprising utilizing a predetermined current signature from a voice coil motor (VCM) to trigger monitoring the shock sensor signal.

13. The method as in claim 11, wherein monitoring the stability of the magnetic head comprises at least one of:
  i.) determining magnitude of the shock sensor signal, comparing the shock sensor signal magnitude with a predetermined shock threshold limit, and determining whether the shock sensor signal magnitude exceeds the predetermined shock threshold limit;
  ii.) determining magnitude of the shock sensor signal using a recursive root-mean square (RMS) value measured in the time domain, comparing the shock sensor signal RMS value with the predetermined shock threshold limit, and determining whether the shock sensor signal RMS value exceeds the predetermined shock threshold limit;
  iii.) determining variance of the shock sensor signal, comparing the shock sensor signal variance with the predetermined shock threshold limit, and determining whether the shock sensor variance exceeds the predetermined shock threshold limit; and
  iv.) determining spectrum of the shock sensor signal, comparing a fast Fourier transform (FFT) of the shock sensor signal with the predetermined shock threshold limit, and determining whether the FFT of the shock sensor signal exceeds the predetermined shock threshold limit.

14. The method as in claim 11, further comprising utilizing a controller to determine whether the shock sensor signal exceeds a predetermined threshold limit.

15. The method as in claim 11, further comprising: i.) tracking shock sensor signals that exceed a predetermined shock threshold limit during a predetermined time period, ii.) tracking head loading or unloading cycles during the predetermined time period, and iii.) determining a percentage of shock sensor signals that exceed the predetermined shock threshold limit relative to head load or unload cycles.

16. The method as in claim 11, further comprising:
  i.) setting a bandwidth of the shock sensor signal, utilizing a low pass filter, and
  ii.) setting a gain of the shock sensor signal to adjust the sensitivity of the shock sensor, utilizing an amplifier.

17. The method as in claim 11, wherein monitoring stability of the magnetic head further comprises at least one of:
  a.) monitoring piezoelectric transducer (PZT) induced voltage on a head gimbal assembly (HGA) during at least one of: i.) preloading of the magnetic head beside the recording media, ii.) loading of the magnetic head beside the recording media, iii.) pre-unloading of the magnetic head from the recording media, and iv.) unloading of the magnetic head from the recording media, and
  b.) monitoring spindle speed during at least one of: i.) preloading of the magnetic head beside the recording media, ii.) loading of the magnetic head beside the recording media, iii.) pre-unloading of the magnetic head from the recording media, and iv.) unloading of the magnetic head from the recording media.

18. The method as in claim 11, wherein monitoring the stability of the magnetic head is performed during a head gimbal assembly (HGA) loading or unloading quality back-end test, or during a HGA or head stack assembly (HSA) component test.

* * * * *